Patented Aug. 16, 1927.

1,639,316

UNITED STATES PATENT OFFICE.

CHARLES W. TROUT, OF OVERLAND, MISSOURI, ASSIGNOR, BY DIRECT AND MESNE ASSIGNMENTS, TO N. S. T. AUTOMOBILE POLISH MFG. CO., OF ST. LOUIS, MISSOURI, A CORPORATION OF MISSOURI.

POLISH.

No Drawing.   Application filed January 10, 1927.   Serial No. 160,301.

The object of my invention is to make a polish to be used in cleaning and polishing automobile bodies, furniture, floors, including hardwood floors, nickelplated ware, glass ware, including windshields, etc.

A further object is to make a cleaner, filler and polisher for the articles indicated which is made of inexpensive ingredients and which can be easily applied and one that produces a high polish that remains for great periods of time. In applying my polish it is only necessary to dampen a cloth with it and rub the cloth over the surface to be cleaned and polished. The dirt will be removed from the surface on to the cloth and a high lustre will be produced on the surface.

With these and other objects in view, my invention has relation to a polish made of few and simple ingredients that may be easily mixed as is pointed out in this specification and in the claims.

The polish is made by mixing the following ingredients in the following proportions. The best grade of cylinder oil, 4 ounces, which acts as the filler and fills the cracks and crevices and uneven places on the surface; extract of dandelion, 3 drops, which is the coloring agent; 2 drops of varnish and 2 drops of beeswax, which together form the polishing agent, and 10¾ ounces gasoline, which is the cleaning agent. The result is an amber colored fluid, the ingredients remaining in solution at all normal temperatures.

What I claim and mean to secure by Letters Patent is—

A composition of the character described, comprising the following ingredients in the following proportions: cylinder oil, 4 ounces; varnish, 2 drops; beeswax, 2 drops; gasoline, 10¾ ounces.

In testimony whereof I affix my signature.

CHARLES W. TROUT.